United States Patent
Heiner et al.

[11] Patent Number: 6,095,357
[45] Date of Patent: Aug. 1, 2000

[54] TAMPER PROOF FOR REUSABLE CLOSURE SYSTEM

[75] Inventors: Volker Ludwig Heiner, Nieder-Wiesen; Detlef Johannes Gustav Muller, Schwalbach, both of Germany

[73] Assignee: The Procter & Gamble Company, Cincinnati, Ohio

[21] Appl. No.: 09/194,104

[22] PCT Filed: May 20, 1997

[86] PCT No.: PCT/US97/08531

§ 371 Date: May 17, 1999

§ 102(e) Date: May 17, 1999

[87] PCT Pub. No.: WO97/44264

PCT Pub. Date: Nov. 27, 1997

[30] Foreign Application Priority Data

May 20, 1996 [EP] European Pat. Off. ............... 96107985

[51] Int. Cl.⁷ .................................................. B65D 53/00
[52] U.S. Cl. .................... 215/270; 215/230; 215/349; 215/350; 220/240
[58] Field of Search ................... 215/230, 262, 215/270, 271, 276, 349, 350; 220/231, 240

[56] References Cited

U.S. PATENT DOCUMENTS

| | | |
|---|---|---|
| 2,040,798 | 5/1936 | Schoonmaker . |
| 3,445,023 | 5/1969 | Giessler et al. ............... 215/276 X |
| 4,122,964 | 10/1978 | Morris ............................ 215/260 |
| 4,673,096 | 6/1987 | Towns et al. ................. 215/230 |
| 4,678,082 | 7/1987 | Fillmore ..................... 215/230 X |
| 4,957,211 | 9/1990 | Ekkert et al. ................. 215/230 |
| 5,022,545 | 6/1991 | Carson .......................... 215/230 |
| 5,033,633 | 7/1991 | Heilmann .................... 215/271 |

FOREIGN PATENT DOCUMENTS

| | | |
|---|---|---|
| 845 904 | 12/1976 | Belgium . |
| 0 227 087 | 7/1987 | European Pat. Off. . |
| 948 554 | 8/1949 | France . |
| 256 811 | 3/1949 | Switzerland . |

*Primary Examiner*—Stephen K. Cronin
*Attorney, Agent, or Firm*—Paul M. Ulrich; T. David Reed

[57] ABSTRACT

The present invention relates to closure systems (10) for a container for pourable material in particular for pourable material for human consumption such as beverages. The closure system (10) comprises a closure frame (20) and a sealing means (30) which is removably joined to the closure frame to provide appropriate sealing of the container. The present invention allows to reuse the closure frame and provides a temper proof indication.

3 Claims, 2 Drawing Sheets

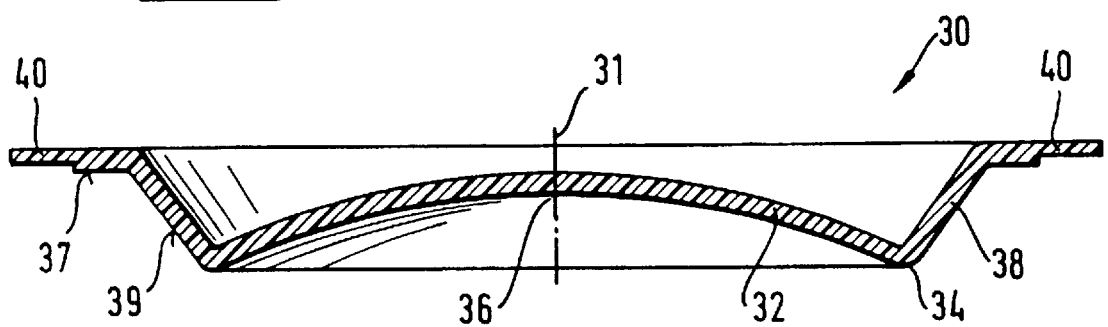
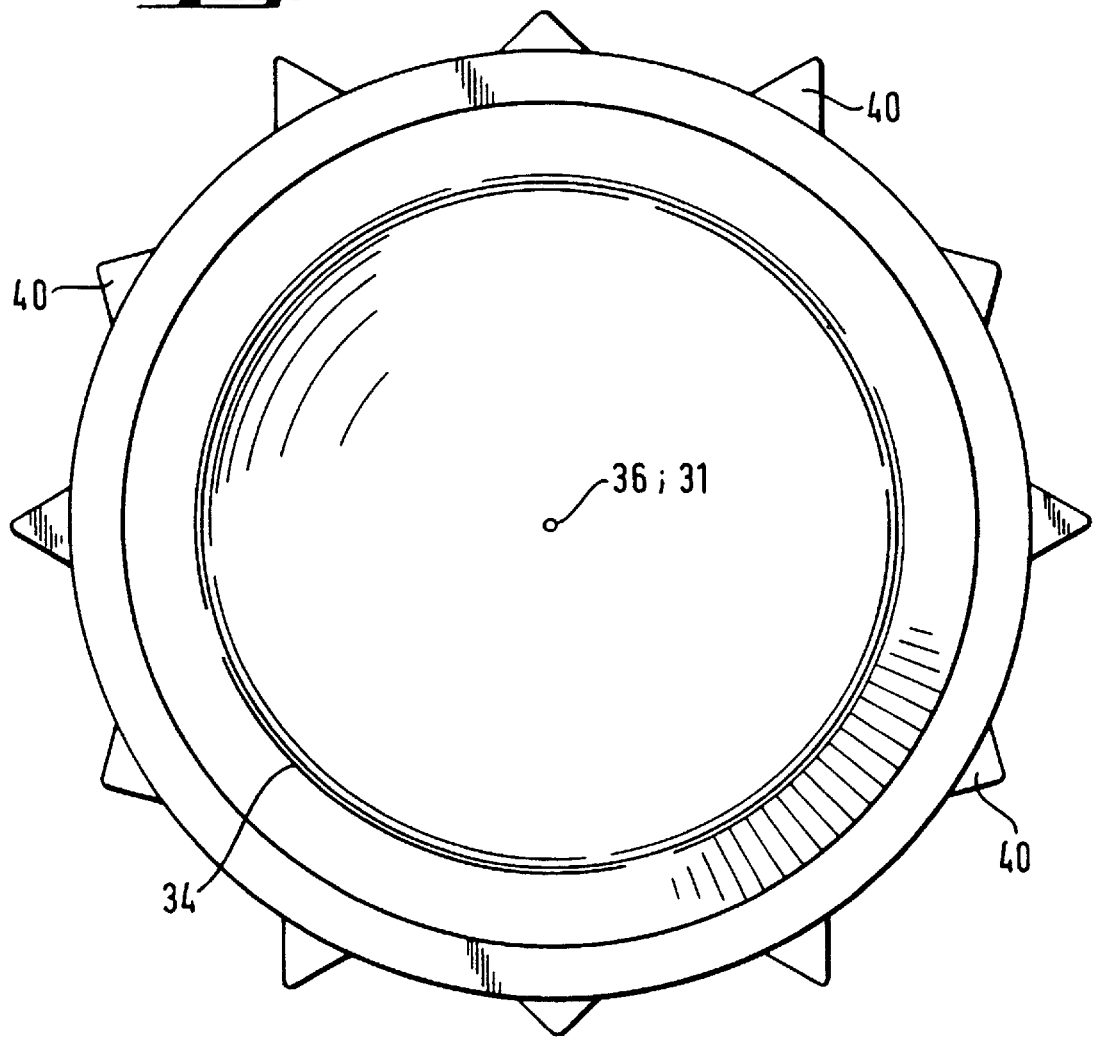

TAMPER PROOF FOR REUSABLE CLOSURE SYSTEM

FIELD OF THE INVENTION

The present invention relates to closure systems for a container for pourable material in particular for pourable material for human consumption such as beverages. In particular the closure system relates to a beverage bottle having a screw cap closure system. The closure system comprises a closure frame providing the physical stability and protection of the closure system and a sealing means which is removably joined to the closure frame to provide appropriate sealing of the container. The present invention allows to reuse the closure frame but continues to provide a tamper proof indication.

CROSS REFERENCE

This application relates to and is filed on the same date at the European Patent Office as the following applications: "RECYCLABLE CLOSURE SYSTEM", attorney docket CM-1213FQ with the inventor Volker Heiner; "REUSABLE CLOSURE SYSTEM", attorney docket CM-1215FQ with the inventor Volker Heiner; both filed in the name of THE PROCTER & GAMBLE COMPANY, Cincinnati, Ohio, USA.

BACKGROUND OF THE INVENTION

Twist off caps or screw cap closure systems for bottles are well-known in the art. Typically these systems comprise a closure frame which has integrally joined to it a sealing means to provide a barrier between the environment and the content of the bottle. Often in particular for fruit juice comprising beverages these bottles are provided under a reduced internal pressure such that the twist off cap is slightly deformed by being pulled into the bottle and upon releasing the seal provides an audible signal indicating an intact temper proof.

FR-A-946 554, EP-A-227 087, BE-A-845 904, U.S. Pat. No. 2 040 798, CH-A-256 811 all disclose closures comprising a closure frame and a sealing means which deforms visibly under vacuum pochaying (?) conditions. However some of the prior art documents disclose reusable closure frames or considers the provision of audible temper proof indications.

The sealing means used in these twist off caps is usually provided by polyvinylchloride material. Polyvinylchloride (herinafter abreviated by PVC) does provide certain benefits to the sealing means e. g. the repeatable ability to undergo deformations to provide proper sealing. However, these advantages are balanced with certain disadvantages which are in particular environmental concerns with PVC. Especially when attempting to recycle the closure system it is necessary to remove paint and PVC from the closure frame prior to recycling the closure frame e.g. by melting it. This removal of the PVC and paint is usually achieved by burning but has become very uneconomical due to ecological concerns about PVC fumes and the resulting precautions for the process.

Also PVC has a high affinity to absorb organic compounds. Therefore twist off cap closures having PVC sealing means cannot be reused for containers comprising materials for human consumption because the sealing means will become contaminated, i.e. loaded with the organic compounds present in the container content. Reuse or recycling of sealing means having such contamination is of course prohibited under many local regulatory laws.

On the other hand it would be desirable to recycle or reuse the closure system since it is usually made to be durable enough to allow reuse or if less durable closure systems are employed (for example having a thin walled closure frame) at least recycling without the negative aspects caused by its multimaterial components is desirable.

Hence there is a need to provide a closure system which can be reused or recycled without the problems associated with known screw cap/sealing means. However since consumers have become used to tamper proof indications the present invention needs to provide such a closure system with tamper proof indication either similar to those currently available or alternative tamper proof indication.

SUMMARY OF THE INVENTION

The present invention relates to a closure system for a container for pourable material such as a bottle for liquids preferably a bottle for beverages. The closure system is separable from the container, i.e. the present invention does not relate to closure systems which are kept connected to the container while the container is open and some of the container content is removed from the container. The closure system according to the present invention comprises a closure frame and a sealing means where the sealing means is removably joined to the closure frame and the closure frame can be reused.

The term "removably joined" as used hereinafter refers to a connection between the sealing means and the closure frame which under usual use conditions will maintain their connection such that they appear to be one system. However removal of the sealing means from the closure frame does not cause any undue burden or special effort if carried out by a mechanical device or by a person. In particular no part of the closure frame will be scratched or damaged due to the automated removal of the sealing means. Most preferably this is achieved by frictional measures, constructive measures, or combination thereof. However adhesives which leave no or an acceptable residue on the closure frame can also be employed in the context of the present invention.

The term "reusable" as used hereinafter means the possibility of using the same item for the same purpose again at least one time, but preferably several times. The term "a reusable closure frame" is therefore more limited than the term "a recyclable closure frame" since the term "recyclable" as used hereinafter refers to a closure frame which can be reused or which is made of materials such that it allows to use the material again in order to provide new articles of manufacture. This new article of manufacture can be alternatively the same article of manufacture from which the recycled material is provided (this can alternatively be termed "complete recycling") or a different article of manufacture which has e.g. a lower purity requirement.

Preferably the closure system according to the present invention is a screw cap system and can be separated from the container which it closes by unscrewing. In an even more preferred embodiment according to the present invention the closure system is a "twist off" system which is removable by unscrewing the closure system with about one quarter or even less turn of the closure frame.

The sealing means according to the present invention comprises preferably a flexible disc of polymeric material in particular of polyethylene material. The disc in a preferred embodiment has a substantially circular perimeter and a central axis which is substantially perpendicular to the flexible disc. This flexible disc has in a relaxed state a concave shape in which the center of the disc bends away from the container which it closes. A further preferred embodiment of the concave disc additionally comprises a circular flange depending from the disc. The flange comprises a conical portion and a fixation portion for joining the sealing means to the closure frame in at least two, most preferably 24 or more, tongues which can be rounded but are preferably pointy at their tips and which tongues provide even better/firm joining between the sealing means and the closure frame by friction.

According to the present invention a preferred closure frame comprises a substantially flat portion which has a substantially circular perimeter and a flange depending from the flat portion along that perimeter. The flange of that closure frame has a proximal edge adjacent the circular perimeter of the flat portion of the closure frame and a distal edge furthest away from the proximal edge from the flange. Preferably the flange has a folded rim at the distal edge with the rim forming several extending tongues for use of that closure frame as a screw cap or twist off closure frame. The flange of the closure frame preferably provides part of the surface to which the sealing means is removably joined and preferably the folded rim also provides at least part of the means by which the sealing means is removably joined to the closure frame.

The container according to the present invention has an internal pressure below the ambient pressure prior to initial opening (which is usual in particular for non carbonated beverages) therefore the sealing means according to the present invention will assume a deformed position which provides a direct visual indication or an indirect indication that the pressure in the container has not been relieved in respect to the ambient pressure and thereby provides a tamper proof indication. In particular deformation of the closure frame follows the deformation of the sealing means such that an audible signal is generated upon initial opening.

BRIEF DESCRIPTION OF THE DRAWINGS

The objects and advantages of the present invention will become more apparent when viewed in conjunction with the following drawings in which:

FIG. 4 is a cross sectional view of a sealing means similar to that shown in the closure system in FIG. 1.

FIG. 5 is a bottom plan of view of the sealing mean of FIG. 4.

DETAILED DESCRIPTION OF THE INVENTION

According to the present invention a closure system for pourable materials in containers is provided. The pourable materials can be any kind of liquid or solids in a pourable form, i.e. typically granules or powders. Preferably the materials for which the closure systems of the present invention are designed are liquids for human consumption and in that respect particularly fruit juice or other organic compound comprising beverages such as milk, fruit juice or aroma comprising refreshment drinks, colas, or lemonades. For such liquids it is also often desirable to create an internal environment in the container of a pressure below the ambient pressure.

The container according to the present invention for which the closure systems can beneficially be used, can in principal be any kind of container. However bottles, particularly bottles which are transparent such as PET-bottles, glass bottles or bottles of other transparent polymeric materials are preferred, with glass bottles being the most preferred containers.

Figure 1:
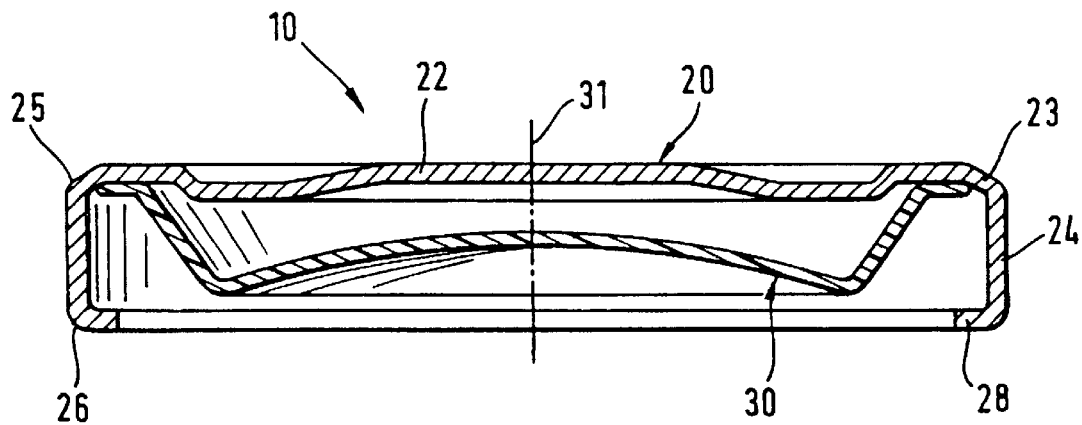
FIG. 1 is a cross-sectional view of the closure system according to the present invention.
Figure 2:
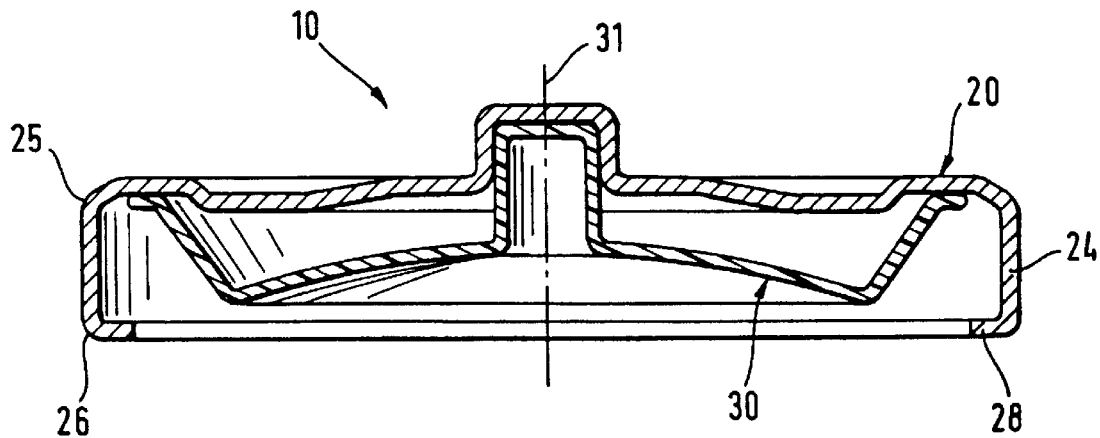
FIG. 2 is a cross-sectional view of an alternative closure system according to the present invention having an alternative joining means.
Figure 3:
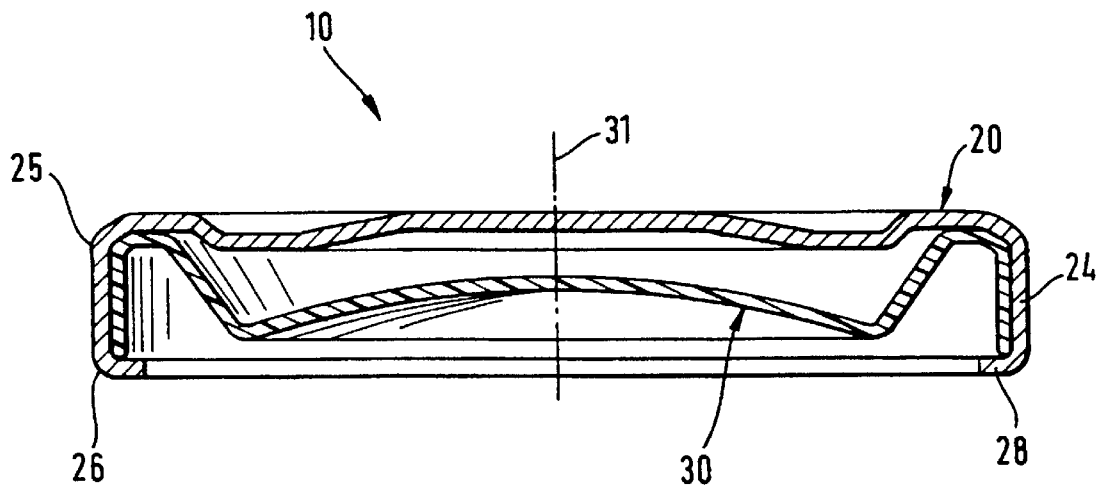
FIG. 3 is a cross-sectional view of yet another alternative closure system according to the present invention

A closure system according to the present invention is shown in FIGS. 1, 2 and 3 in three alternative embodiments which will be explained in the following by reference to these drawing. In FIG. 1 the closure system (10) is shown in a cross-sectional view comprising the closure frame (20) and the sealing means (30). The closure frame (20) comprises a flat portion (22) having a perimeter (23). The flat portion (22) need not to be absolutely flat but can be provided with minor depressions or raises parallel to the central axis (31).

From the perimeter (23) of the flat portion (22) a flange (24) depends. The flange has a proximal edge (25) which joins the flange to the flat portion (22) along the perimeter (23) and a distal edge (26) which is furthest away from the proximal edge (25) of the flange (24). At the distal edge (26) of the flange (24) the closure frame (20) can have and preferably has a folded rim (28). The folded rim (28) is bent inward toward a rotational symmetry axis or central axis (31) of the sealing means (30). For screw cap systems or twist-off systems portions of this rim provide extending tongues which provide the screw thread for such a screw cap system.

The closure frame (20) can also have different shapes as can be seen in FIG. 2 showing an alternative embodiment of the closure frame having a central portion raised in order to form a central circular notch into which a portion of the sealing means can be inserted to provide a removable joining between them. This notch or alternatively an aperture in the center of the closure frame can also be utilized to connect the sealing means and the closure frame for tamper proof reasons as will be explained later.

The closure frame (20) provides stability to the screw cap system and protects the sealing means (30). It therefore is preferably made out of a material which is durable and shape stable. Particularly iron comprising metal sheet material such as tin is preferred.

These materials are fairly expensive such that discarding them after one use would be undesirable. Hence it is preferred to provide a closure frame capable of reuse at least one, but preferably several times.

Such a closure frame could be made of metal coated with a durable coating of paint on both sides. It would then be possibile to provide indications on the screw cap of the number of reuses in order to sort out closure frames after a preset number of reuses for example after five times reusing the closure frame.

Other usual construction or design characteristics of closure frames can also be optionally present in embodiments according to the present invention. In particular easy grip ripples on the flange, sorting and positioning aids are common in this respect.

The second important part of the closure system according to the present invention is the sealing means (30). The sealing means (30) is shown in FIGS. 1, 2 and 3 in a cross-sectional view through its rotational symetry axis or central axis (31). The sealing means (30) has the function to connect at its periphery with the rim of the aperture of the container which is to be sealed. Mechanically this is achieved by placing the closure frame over the container opening with the sealing means inbetween such that the sealing means is pressed onto the rim of the aperture in the container to be sealed.

The sealing means comprises a flexible concave disk portion (32) having a substantially circular perimeter (34). The concave disk (32) in a relaxed state has a concave shape in which the center (36) of the concave disk (32) bends away from the container. Further the sealing means (30) has a circular flange (38) depending from the perimeter (34) of the concave disk (32). The flange depending from the concave disk (32) has a conical portion (39) and a fixation portion (37) for joining the sealing means (30) to the closure frame (20).

The fixation portion (37) preferably ends in a number of tongues (40), preferably in a number of pointy tongues (40) as shown in FIG. 5. The term pointy in this context includes tongues having a slightly rounded or a cutoff tip without loosing the generally pointy appearance. The tongues (40) can be present in any number but are preferably provided symmetrical around the circular periphery of the fixation portion (37), i.e. there should be at least 2 tongues (40). Most preferred are the sealing means with 24 or more tongues (40).

The sealing means (30) can be made of any material which provides the necessary flexibility and elasticity to create the desired seal of the aperture in the container to be closed. Most preferred and economically desirable are thermoplastic materials such as PVC, polyethylene, polypropylene but also cured polymeric materials such as synthetic rubber or similar materials can be used.

The sealing means (30) can be provided by combinations of material which satisfy the different functions of the sealing means better than one single material would. In this context sealing means having tongues (40) made of material which in conjunction with the closure frame has a high coefficient of friction but using a different material for the concave disk portion (32) is considered.

However for recyclable sealing means a mixture of materials is not as desirable as a sealing means made of a single material. In particular polyethylene or polypropylene are preferred in the context of closure systems according to the present invention.

A further consideration when selecting the material for the sealing means (30) should be taken into account. Since a tamper proof indicator is desired, especially for pourable material for human consumption and in particular for beverage bottles, the sealing means should also provide indication of weather the content of the container prior to initial opening has been exposed to the environment.

The container according to the present invention has an internal pressure below the ambient pressure prior to initial opening, which is usual in particular for non carbonated beverages. The sealing means (30) according to the present invention will assume a deformed position which either provides a visual indication that the pressure in the container has not been relieved in respect to the ambient pressure and thereby provides a tamper proof indication.

The visual tamper proof indication can be achieved if the container is a transparent, in particular a glass container which allows simply to visually inspect the sealing means by looking into the bottle at the inner portion of the aperture forming the opening in the container which the closure system according to the present invention closes. In this case the sealing means needs to be deformed prior to initial opening to such an extent that it can be easily recognizable from the outside. This is achieved by the pressure differential between the inner surface of the sealing means (30) and the ambient pressure. In this deformed position the concave disk portion (32) bends contrary to its relaxed position convexly downward into the container opening such that at least the center of the disk (36) can easily be seen from the outside. In this context it has been found that polyethylene material does provide the required flexibility and since it can be coloured an additional aid for the visual inspection of the tamper proof can be provided.

In addition a tamper proof indication is provided when the deformed position of the sealing means is not easily recognizable by visual inspection for example for containers which are not transparent or which are transparent but with a dark colour such as dark brown glass. Then the tamper proof is beneficially provided by joining the sealing means (30) to the closure frame (20) such that the central portion of the closure frame is deformed together with the sealing means and provides an audible signal (a click) upon initial opening of the container. This joining has to be strong enough to transmit the forces causing the deformation of the sealing means under a reduced inner pressure.

It can either be provided mechanically such that the central portion of the sealing means is simply connected to the central portion of closure frame as shown in FIG. 2. However, the material connection between both parts of the closure system must be such that it can be broken and easily and fully removed from the closure frame in order to maintain its reusability. In an alternative embodiment this can be achieved by anchoring the sealing means to the closure frame through a small central aperture in the closure frame e.g. by a thread like extention of the sealing means in its center.

In the alternative the force can be pneumatically transmitted when the sealing means (30) as shown in FIG. 3 also creates a sealed off inner space the sealing means (30) and the closure frame (20) and thereby transmits the deformation forces of the reduced pressure in the container via the sealing means to the closure frame (20) again causing it to produce an audible signal upon initial opening of the container.

What is claimed is:

1. A reusable tamper proof closure system for packaging a material in a container at a pressure below the ambient pressure prior to initial opening of said closure system, said closure system comprising:

a reusable closure frame, said closure frame comprising a substantially flat portion having a substantially circular perimeter; a flange depending from said flat portion along said perimeter, said flange having a proximal edge adjacent said circular perimeter of said flat portion, a distal edge furthest away from said proximal edge and a folded rim at said distal edge, wherein said folded rim forms several tongues for use of said closure frame as a screw cap;

a sealing means which is removably joined to said closure frame;

said screw cap system being characterized in that said sealing means assumes a deformed position due to the pressure in said bottle prior to initial opening, said deformed position providing a visual indication that said pressure in said bottle has not been relieved in respect to said ambient pressure; and wherein said container is a glass transparent bottle, said material is a beverage, and said closure system is a screw cap system.

2. Reusable closure system according to claim 1 wherein said sealing means is inserted into said closure frame and deforms under the pressure in said bottle prior to initial opening such that it is pulled far enough into said bottle to be recognisable upon visual inspection of said bottle from the outside of said bottle.

3. Reusable closure system according to claim 2 wherein said flat portion of said closure frame follows the deformation of said sealing means by elastic deformation such that an audible signal can be registered upon initial opening of said closure system.

* * * * *